Sept. 4, 1934.  L. F. NENNINGER  1,972,827

MILLING MACHINE STRUCTURE

Filed Nov. 7, 1930

Inventor

LESTER F. NENNINGER

By A. H. Parsons

Attorney

Patented Sept. 4, 1934

1,972,827

UNITED STATES PATENT OFFICE

1,972,827

MILLING MACHINE STRUCTURE

Lester F. Nenninger, Cincinnati, Ohio, assignor to The Cincinnati Milling Machine Company, Cincinnati, Ohio, a corporation of Ohio Application November 7, 1930, Serial No. 494,100

3 Claims. (Cl. 90—58)

This invention relates to a milling machine organization and more particularly to improvements in the structural elements thereof.

It has been habitually the practice in the manufacture of milling machines of the knee and column type to provide a column having vertical guideways formed upon one face thereof for the reception of a knee having complementary guides formed thereon whereby the knee may be vertically adjusted with respect to a cutter mounted on a cutter spindle journaled in the upper part of the column. The knee is usually provided with additional guideways for receiving a work support unit, such as a saddle and a table, the saddle serving to support the table on the knee for lateral adjustment with respect to the cutter and the column.

In these prior structures the vertical guides on the knee extended a substantial amount above the plane of the saddle guideways which was unsatisfactory for several reasons in that the knee had to have a large overhang in order to provide the proper range of adjustment for the saddle which in turn caused the cutter supporting structure to project from the column correspondingly, resulting in a rather unwieldly structure. Furthermore, the shape of the knee was such as to necessitate expensive machining operations in order to finish it.

It is, therefore, one of the objects of this invention to generally improve the construction of the work support organization of a knee and column type milling machine and more particularly the knee support thereof whereby the overhang of the work support organization will be substantially reduced over prior structures thereby adding to the stability of the machine without impairing its efficiency or reducing its working area.

Another object of this invention is to provide a knee for a milling machine which is so constructed that it may be manufactured by improved precision methods resulting in a more accurately formed product capable of imparting increased efficiency to a machine of which it forms a part.

Other objects and advantages of the present invention should be readily apparent by reference to the following specification considered in conjunction with the accompanying drawing illustrative of one embodiment thereof, but it will be understood that any modifications may be made in the specific structural details hereinafter disclosed, within the scope of the appended claims, without departing from or exceeding the spirit of the invention.

Referring to the drawing in which like reference numerals indicate like parts:

Figure 1:
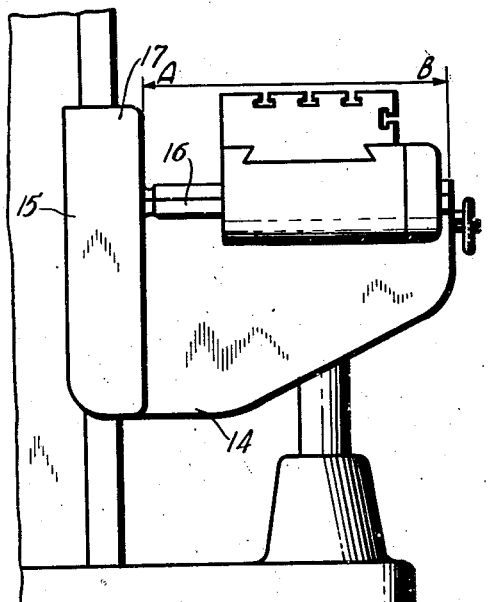
Figure 1 is a view illustrating prior practice in the manufacture of knees for milling machines.

In the drawing the reference numeral 10 indicates the column of a milling machine having guideways 11 formed upon a vertical face thereof for receiving a vertically adjustable knee 12 having guideways 13 formed on a vertical face thereof complementary to the column guideways. A cutter spindle is adapted to be journaled in the upper part of the column for rotating a cutter which may be mounted on an arbor supported at its outboard end by a pendant affixed to an overarm in the usual manner.

In Figure 1 is illustrated a milling machine of the knee and column type, the knee 14 of which illustrates the prior practice in the manufacture of such supports for milling machines. It will be noted that the guideway 15 of the knee extends a considerable amount above the plane 16 of the saddle guideway. This projection 17 is objectionable for many reasons, chief among which is that the saddle guideways cannot be machined by modern production methods and also that the range of saddle movement illustrated by the line A—B is necessarily spaced from the column thereby adding to the overhang of the knee, as well as to its weight, resulting in an unwieldy structure that is difficult to adjust.

The chief objects of this invention are to overcome the above objections by providing a knee support that may be manufactured more economically and will be lighter in weight without decreasing the range of saddle movement and which will add to the stability of the machine.

The knee 12 serves to support on its upper surface a work support unit comprising a saddle 18 and a table 19. The table is reciprocably mounted on the saddle for longitudinal movement transversely of a cutter axis and the saddle, in turn, is slidably mounted upon the knee for effecting lateral adjustment of the table with respect to the plane of a cutter. For the purpose of obtaining the maximum amount of lateral adjustment of the table and for positioning the range of this adjustment in a suitable longitudinal position with respect to a horizontal cutter axis, as well as for machining purposes, the saddle guideways on the upper surface of the knee, which extend in a direction normal to the column guideways 11, are so formed and positioned as to extend the full length of the knee and directly intersect the vertical guideways 13 in such a manner as to determine their extent. When the knee is assembled upon the column the saddle guideways will abut the column face thereby permitting the saddle to be moved to a point approximately in contact with the column but practically a slight clearance is allowed.

Figure 3:
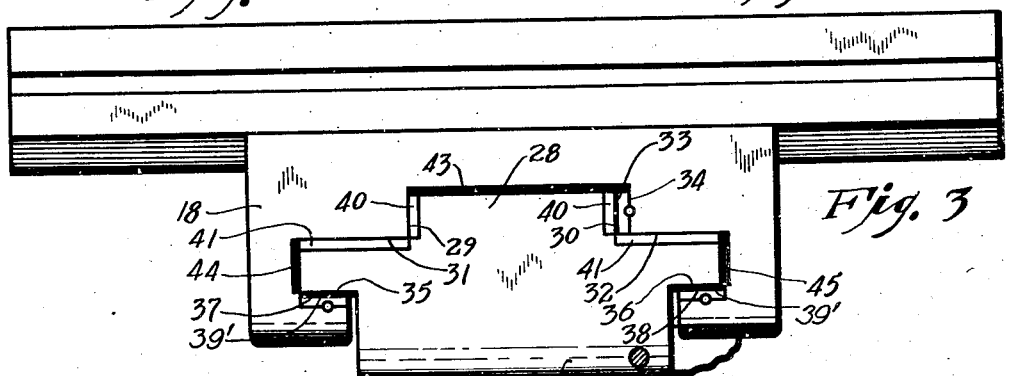
Figure 3 is an end view of the knee illustrating the saddle guideways formed thereon as viewed on the line 3—3 of Figure 2.
Figure 5:
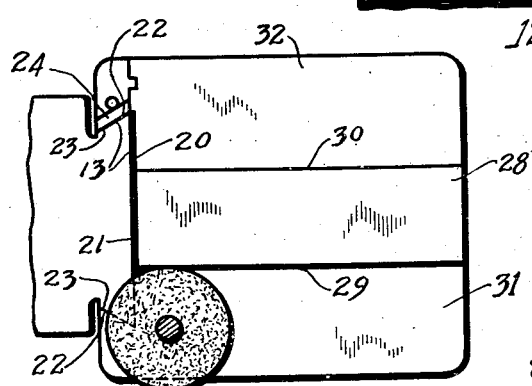
Figure 5 is a plan view showing the method of grinding the saddle guideways.

The relative relation of the intersecting guideways in the knee will be more clearly understood by reference to Figures 3 and 5 in which the surface 20 represents the bearing surface that directly contacts the vertical bearing surface 21 of the column and the reference numerals 22 indicate the lateral guides of the knee which engage the vertical guide surfaces 23 formed on the column. A gib, such as 24, may be interposed between one of the vertical faces 23 of the column and the corresponding guide surface on the knee for adjustment purposes. The upper surface of the knee lies in a plane at right angles to the surface 20 and has formed longitudinally through the center thereof the raised portion 28 which also extends at right angles to the surface 20 for receiving thereon the saddle 18. This upraised portion forms the lateral guide surfaces 29 and 30 leaving the plane bearing surfaces 31 and 32 for supporting the saddle. There is a slight clearance at 43 between the upper surface of the portion 28, as well as a clearance at 44 and 45 between the saddle and knee which results in the surfaces 31 and 32 supporting all the weight of the saddle, while the surfaces 29 and 30 act as the sole means for guiding the saddle horizontally. For the purpose of adjustment and take-up for wear, a gib, such as 33, may be interposed between the lateral guide surface 34 of the saddle and the guide surface 30 of the knee. In order to prevent the saddle from lifting additional guide surfaces, such as 35 and 36, are formed on the under side of the knee and are engaged respectively by the surfaces 37 and 38 formed on gibs 39' interposed between the saddle and the knee. From Figure 5 it will be noted that the surfaces 29, 30, 31, 32, 35 and 36 extend the full length of the knee, the surfaces 29 and 30 being terminated at one end by intersection with the vertical guide surface 20.

Figure 2:
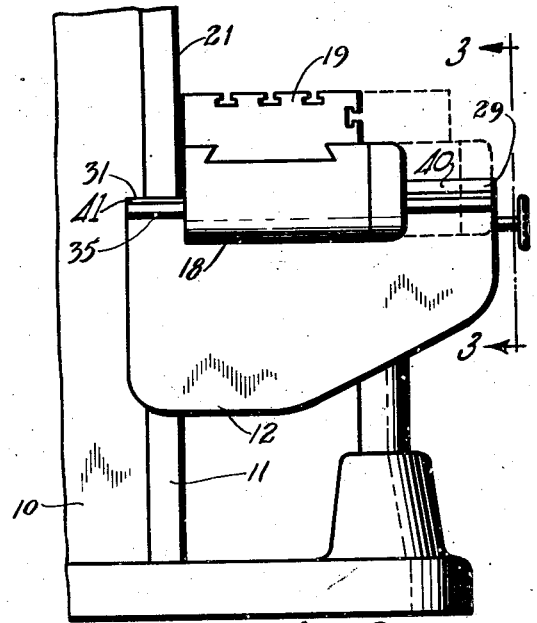
Figure 2 is an elevation of a milling machine having mounted thereon an improved knee which embodies the principles of this invention.

From the foregoing description it should now be apparent that the saddle guideways extend from the column face, as shown in Figure 2, to the outboard end of the knee permitting lateral adjustment of the saddle and thereby the table from substantially the face of the column, as shown in full lines, to the extreme outboard end of the knee, as shown in the dotted line position of the saddle and table in that figure. It will also be noted that the longitudinal cutter axis permits the positioning of the cutter on its arbor closer to the spindle nose than would otherwise be possible in a construction where the table could not be moved to such a position. This necessarily reduces the overhang of the cutter supporting structure thereby adding to the stability of the machine, as well as reducing vibration and chatter.

Figure 4:
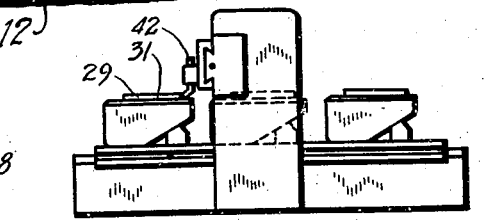
Figure 4 is a diagrammatic view showing one method of machining the guideways in production lots.

Another important advantage in forming the guideways in the knee in the manner described is the reduction in the cost of machining the surfaces thereof. In prior structures, such as illustrated in Figure 1, it was necessary to machine the guide surfaces of each knee separately and, due to the construction thereof, it was impossible to adopt any production methods in their manufacture. In contrast it will be seen that the knee structure constituting this invention readily adapts itself to such methods since there are no obstructions to interfere with the tool from passing successively over a plurality of faces in one stroke, such as illustrated in Figure 4. From this figure it will be seen that the saddle guideways 29, 30, 31 and 32 of a plurality of knees may be aligned for successive machining and by the use of similar methods the surfaces 20 and 23 may also be finished by properly positioning the knees with respect to the tool. It will also be noted by reference to Figure 5 that a pair of surfaces, such as 29 and 31, may be finished simultaneously as by a grinding tool or other finishing cutter 39 and that by means of the improved construction the tool may pass beyond each end of the surface without any interference. In such a case the parts may be aligned, as illustrated in Figure 4, and a rotating tool substituted for the tool 42 illustrated in that figure. Since the grinding operation may now be carried out by a progressive continuous movement of the tool along the surface and beyond the end thereof, which was impossible with prior structures, a finished surface is produced which is accurately formed and aligned with the other surfaces and, due to the uniform continuous movement of the tool, is of uniform density and has even wearing qualities.

If so desired the guide surfaces 29 and 30 and the bearing surfaces 31 and 32 may be formed on hardened metallic plate in-sets, such as 40 and 41, illustrated in Figure 3. These plates are secured in place on the knee and subsequently ground while in position thereby making it possible to produce surfaces which will be accurately formed and in proper angular or parallel relation with each other. In such a case, one pair of surfaces, such as 29, 31, may be ground and then the other pair 30, 36 ground with the guide surface 30 ground parallel to the surface 29. By utilizing this method, the costly operation of hand scraping is entirely eliminated and true parallelism of the guide surfaces is obtainable.

From the foregoing description it should now be apparent that a knee structure has been provided for a milling machine that may be manufactured at a low cost and which provides for more satisfactory adjustment of the table with respect to its cutter and is so constructed as to have a minimum of overhang compatible with providing the necessary working area.

That which is claimed is:

1. A knee for a milling machine having intersecting horizontal and vertical faces, marginal guides projecting from the vertical face for engagement with complementary surfaces on the column, a gib interposed between one guide and its complementary surface, a rectangular shaped median portion projecting from the horizontal face, guide surfaces for a saddle formed on the sides of said portion, a gib interposed between one of said guide surfaces and the saddle, saddle bearing surfaces spaced at opposite sides of the median portion, additional surfaces formed on the knee in spaced parallel relation to the bearing surfaces to prevent lifting of the saddle and gibs interposed between each of said additional surfaces and the saddle.

2. A knee for a milling machine having two faces intersecting normal to one another, marginal guides projecting from the plane of one face for the reception of complementary guide surfaces formed on the column, a median guide projecting from the other face, bearing surfaces formed at opposite sides of the median guide for the reception of a saddle having complementary guide and bearing surfaces formed thereon, said median guide intersecting the vertical face of the column intermediate the marginal guides formed thereon, additional surfaces spaced from the bearing surfaces and extending parallel thereto, and portions on the saddle for engaging said surfaces to prevent lifting thereof.

3. A knee structure for a milling machine comprising a frame having a vertical guideway formed upon one face thereof, said guideway including marginal guides projecting from the plane of said face for the reception of complementary guide surfaces formed on the column, said frame having a top face extending at right angles to the vertical guideway, a raised median portion formed on said top face and intersecting the vertical guideway intermediate the marginal guides, said median portion having vertical side walls for guiding a saddle for movement toward and from the column, bearing surfaces formed on the top face normal to said side walls, said bearing surfaces extending the full length of the knee in intersecting relation to the vertical guideways for supporting a saddle thereon, additional surfaces vertically spaced from the bearing surfaces for engagement with additional portions on the saddle to maintain the same in contact with said bearing surfaces whereby the saddle will be moved in a plane at right angles to the column.

LESTER F. NENNINGER.